(12) United States Patent
Cai et al.

(10) Patent No.: US 10,771,578 B2
(45) Date of Patent: *Sep. 8, 2020

(54) WEBPAGE LOADING METHOD AND APPARATUS

(71) Applicant: Huawei Technologies Co., Ltd., Shenzhen (CN)

(72) Inventors: Tao Cai, Shenzhen (CN); Li Li, Shenzhen (CN); Guohui Wu, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/234,033

(22) Filed: Dec. 27, 2018

(65) Prior Publication Data

US 2019/0132408 A1   May 2, 2019

Related U.S. Application Data

(63) Continuation of application No. 15/337,735, filed on Oct. 28, 2016, now Pat. No. 10,200,488, which is a
(Continued)

(51) Int. Cl.
*G06F 15/16* (2006.01)
*H04L 29/08* (2006.01)
*H04L 29/06* (2006.01)

(52) U.S. Cl.
CPC ............ *H04L 67/26* (2013.01); *H04L 29/08* (2013.01); *H04L 67/02* (2013.01); *H04L 67/42* (2013.01)

(58) Field of Classification Search
CPC ......... H04L 29/08; H04L 67/02; H04L 67/26; H04L 67/42
(Continued)

(56) References Cited

U.S. PATENT DOCUMENTS

2004/0015537 A1* 1/2004 Doerksen ................ H04L 29/06
709/203
2004/0022391 A1* 2/2004 O'Brien ................ H04L 9/0822
380/281
(Continued)

FOREIGN PATENT DOCUMENTS

CN          103593466 A  *  2/2014
CN          103593466 A      2/2014
(Continued)

OTHER PUBLICATIONS

Machine Translation and Abstract of Chinese Publication No. CN103618787, Mar. 5, 2014, 41 pages.
(Continued)

*Primary Examiner* — Liang Che A Wang
(74) *Attorney, Agent, or Firm* — Conley Rose, P.C.

(57) ABSTRACT

Webpage loading methods and devices include, in addition to sending an address of a first webpage to a server, a client further sends a name of a first-webpage resource stored in the client, such that the server can determine, according to the address of the first webpage and the name of the first-webpage resource stored in the client, a first push resource to be sent to the client, where the first push resource is all the resources required for loading the first webpage apart from the first-webpage resource stored in the client, which avoids pushing, by the server to the client, a resource that has been locally stored in the client, and therefore saves a bandwidth resource of a communications network.

21 Claims, 6 Drawing Sheets

Related U.S. Application Data continuation of application No. PCT/CN2014/076464, filed on Apr. 29, 2014.

(58) Field of Classification Search
USPC .......................... 709/217, 218, 219, 223, 224
See application file for complete search history.

(56) References Cited

U.S. PATENT DOCUMENTS

| | | | |
|---|---|---|---|
| 2004/0049598 A1* | 3/2004 | Tucker | H04L 67/2819 709/246 |
| 2009/0113068 A1* | 4/2009 | Fujihira | H04L 63/08 709/231 |
| 2014/0032708 A1* | 1/2014 | Zamir | H04L 67/10 709/217 |
| 2016/0259800 A1* | 9/2016 | Luo | H04L 67/02 |

FOREIGN PATENT DOCUMENTS

| | | |
|---|---|---|
| CN | 103618787 A | 3/2014 |
| CN | 103678549 A | 3/2014 |

OTHER PUBLICATIONS

Machine Translation and Abstract of Chinese Publication No. CN103678549, Mar. 26, 2014, 19 pages.
Peon, R., et al., "HTTP/2.0 Header Compression," draft-ietf-httpbis-header-compression-01, Jul. 9, 2013, 18 pages.
Foreign Communication From a Counterpart Application, PCT Application No. PCT/CN2014/076464, English Translation of International Search Report dated Jun. 16, 2014, 2 pages.
Foreign Communication From a Counterpart Application, PCT Application No. PCT/CN2014/076464, English Translation of Written Opinion dated Jun. 16, 2014, 27 pages.

* cited by examiner

WEBPAGE LOADING METHOD AND APPARATUS

CROSS-REFERENCE TO RELATED APPLICATIONS

This application is a continuation of U.S. patent application Ser. No. 15/337,735 filed on Oct. 28, 2016, which is a continuation of International Patent Application No. PCT/CN2014/076464 filed on Apr. 29, 2014. Both of the aforementioned applications are hereby incorporated by reference in their entireties.

TECHNICAL FIELD

Embodiments of the present disclosure relate to the computer technologies, and in particular, to a webpage loading method and apparatus.

BACKGROUND

In a current network communications system, to save deployment costs, a browser/server (B/S) architecture is generally used. In the B/S architecture, a user interface (UI) is presented using a client (browser), and a main transaction processing procedure is implemented on a server.

In the B/S architecture, a process of loading a webpage using a Hypertext Transfer Protocol (HTTP) is used as an example for description. The client sends a request message to a server, where the message carries an address of a webpage requested to be accessed. The server returns, to the client according to the address, names of all resources required for loading the webpage. The client sends a request to the server according to the names of all the resources, to request resources corresponding to the names of all the foregoing resources, and the client loads the webpage according to the resources that are corresponding to the names of all the foregoing resources and that are returned by the server.

However, use of the method in other approaches may cause a waste of a bandwidth resource.

SUMMARY

Embodiments of the present disclosure provide a webpage loading method and apparatus in order to save a bandwidth resource of a communications network.

A first aspect of the embodiments of the present disclosure provides a webpage loading method, including receiving, by a server, an address of a first webpage and a name of a first-webpage resource and that is stored in a client, where the address and the name are sent by the client, and the first webpage is a webpage that the client currently requests to access, determining, by the server according to the address of the first webpage, names of all resources required for loading the first webpage, determining, by the server, a first push resource according to the name of the first-webpage resource stored in the client and the names of all the resources required for loading the first webpage, where the first push resource is all the resources required for loading the first webpage apart from the first-webpage resource stored in the client, and sending, by the server, the first push resource to the client.

With reference to the first aspect, in a first possible implementation manner, the method further includes receiving, by the server, a time indication sent by the client, where the time indication is time information of the first-webpage resource stored in the client, determining, by the server according to the time indication, a resource that needs to be updated in the first-webpage resource stored in the client, determining, by the server, a latest resource corresponding to the resource that needs to be updated, and sending, by the server, the latest resource to the client.

With reference to the first possible implementation manner, in a second possible implementation manner, the time indication is a time at which the client accesses the first webpage last time, and determining, by the server according to the time indication, a resource that needs to be updated in the first-webpage resource stored in the client includes determining, by the server according to the time at which the client accesses the first webpage last time, the resource that needs to be updated in the first-webpage resource stored in the client.

With reference to the first possible implementation manner, in a third possible implementation manner, the time indication is a time at which the server modifies the first-webpage resource and that is received when the client accesses the first webpage last time, and determining, by the server according to the time indication, a resource that needs to be updated in the first-webpage resource stored in the client includes determining, by the server according to the time at which the server modifies the first-webpage resource and that is received when the client accesses the first webpage last time, the resource that needs to be updated in the first-webpage resource stored in the client.

With reference to the first possible implementation manner, in a fourth possible implementation manner, the time indication is a time at which each resource in the first-webpage resource stored in the client is stored, and determining, by the server according to the time indication, a resource that needs to be updated in the first-webpage resource stored in the client includes determining, by the server according to the time at which each resource in the first-webpage resource stored in the client is stored, the resource that needs to be updated in the first-webpage resource stored in the client.

With reference to any one of the first aspect, or the first to the fourth possible implementation manners of the first aspect, in a fifth possible implementation manner, the method further includes sending, by the server to the client, the names of all the resources required for loading the first webpage, such that the client determines, according to the names of all the resources required for loading the first webpage, the name of the first-webpage resource stored in the client.

With reference to any one of the first aspect, or the first to the fifth possible implementation manners of the first aspect, in a sixth possible implementation manner, the method further includes receiving, by the server, a name, sent by the client, of a second-webpage resource stored in the client, where the first webpage and a second webpage are located on a same website, determining, by the server according to a preset rule, an address of the second webpage to be accessed by the client, determining, by the server according to the address of the second webpage, names of all resources required for loading the second webpage, determining, by the server, a second push resource according to the names of all the resources required for loading the second webpage, the name of the second-webpage resource stored in the client, and the first push resource, where the second push resource is all the resources required for loading the second webpage apart from the first push resource and the second-webpage resource stored in the client, and sending, by the server, the second push resource to the client.

A second aspect of the embodiments of the present disclosure provides a webpage loading method, including sending, to a server by a client, an address of a first webpage and a name of a first-webpage resource stored in the client, where the first webpage is a webpage that the client currently requests to access, receiving, by the client, a first push resource sent by the server, where the first push resource is all resources required for loading the first webpage apart from the first-webpage resource stored in the client, and loading, by the client, the first webpage according to the first push resource and the first-webpage resource stored in the client.

With reference to the second aspect, in a first possible implementation manner, the method further includes sending, by the client, a time indication to the server, where the time indication is time information of the first-webpage resource stored in the client, and receiving, by the client, a latest resource that is sent by the server and that is corresponding to a resource that needs to be updated in the first-webpage resource, where the resource that needs to be updated in the first-webpage resource is determined by the server according to the time indication.

With reference to the first possible implementation manner, in a second possible implementation manner, the time indication is any one of the types, the time indication is a time at which the client accesses the first webpage last time, the time indication is a time at which each resource in the first-webpage resource stored in the client is stored, or the time indication is a time at which the server modifies the first webpage and that is received when the client accesses the first webpage last time.

With reference to the first possible implementation manner or the second possible implementation manner, in a third possible implementation manner, before sending, by the client, a time indication to the server, the method further includes receiving, by the client, time information sent by the server, where the time information is a time at which the server modifies the first-webpage resource the most recent time, and sending, by the client, the time indication to the server when the client determines that a time indicated by the time information is later than a time indicated by the time indication.

With reference to any one of the second aspect, or the first to the third possible implementation manners of the second aspect, in a fourth possible implementation manner, the method further includes receiving, by the client, names that are of all the resources required for loading the first webpage and that are sent by the server, and determining, by the client according to the names of all the resources required for loading the first webpage, the name of the first-webpage resource stored in the client.

With reference to any one of the second aspect, or the first to the fourth possible implementation manners of the second aspect, in a fifth possible implementation manner, the method further includes sending, to the server by the client, a name of a second-webpage resource stored in the client, where the first webpage and the second webpage are located on a same website, receiving, by the client, a second push resource sent by the server, where the second push resource is all resources required for loading the second webpage apart from the first push resource and the second-webpage resource stored in the client, and loading, by the client, the second webpage according to the second push resource and the second-webpage resource stored in the client.

A third aspect of the embodiments of the present disclosure provides a webpage loading apparatus, including a receiving module configured to receive an address of a first webpage and a name of a first-webpage resource and that is stored in a client, where the address and the name are sent by the client, and the first webpage is a webpage that the client currently requests to access, a determining module configured to determine, according to the address of the first webpage, names of all resources required for loading the first webpage, a processing module configured to determine a first push resource according to the name of the first-webpage resource stored in the client and the names of all the resources required for loading the first webpage, where the first push resource is all the resources required for loading the first webpage apart from the first-webpage resource stored in the client, and a sending module configured to send the first push resource to the client.

With reference to the third aspect, in a first possible implementation manner, the receiving module is further configured to receive a time indication sent by the client, where the time indication is time information of the first-webpage resource stored in the client. The processing module is further configured to determine, according to the time indication, a resource that needs to be updated in the first-webpage resource stored in the client, and determine a latest resource corresponding to the resource that needs to be updated, and the sending module is further configured to send the latest resource to the client.

With reference to the first possible implementation manner, in a second possible implementation manner, the time indication is a time at which the client accesses the first webpage last lime, and the processing module is further configured to determine, according to the time at which the client accesses the first webpage last time, the resource that needs to be updated in the first-webpage resource stored in the client.

With reference to the first possible implementation manner, in a third possible implementation manner, the time indication is a time at which the server modifies the first-webpage resource and that is received when the client accesses the first webpage last time, and the processing module is further configured to determine, according to the time at which the server modifies the first-webpage resource and that is received when the client accesses the first webpage last time, the resource that needs to be updated in the first-webpage resource stored in the client.

With reference to the first possible implementation manner, in a fourth possible implementation manner, the time indication is a time at which each resource in the first-webpage resource stored in the client is stored, and the processing module is further configured to determine, according to the time at which each resource in the first-webpage resource stored in the client is stored, the resource that needs to be updated in the first-webpage resource stored in the client.

With reference to any one of the third aspect, or the first to the fourth possible implementation manners of the third aspect, in a fifth possible implementation manner, the sending module is further configured to send, to the client, the names of all the resources required for loading the first webpage, such that the client determines, according to the names of all the resources required for loading the first webpage, the name of the first-webpage resource stored in the client.

With reference to any one of the third aspect, or the first to the fifth possible implementation manners of the third aspect, in a sixth possible implementation manner, the receiving module is further configured to receive a name, sent by the client, of a second-webpage resource stored in the client, where the first webpage and the second webpage are located on a same website. The determining module is further configured to determine, according to a preset rule, an address of the second webpage to be accessed by the client, and determine, according to the address of the second webpage, names of all resources required for loading the second webpage. The processing module is further configured to determine a second push resource according to the names of all the resources required for loading the second webpage, the name of the second-webpage resource stored in the client, and the first push resource, where the second push resource is all the resources required for loading the second webpage apart from the first push resource and the second-webpage resource stored in the client. The sending module is further configured to send the second push resource to the client.

A fourth aspect of the embodiments of the present disclosure provides a webpage loading apparatus, where the webpage loading apparatus is a client, and includes a sending module configured to send, to a server, an address of a first webpage and a name of a first-webpage resource stored in the client, where the first webpage is a webpage that the client currently requests to access, a receiving module configured to receive a first push resource sent by the server, where the first push resource is all resources required for loading the first webpage apart from the first-webpage resource stored in the client, and a loading module configured to load the first webpage according to the first push resource and the first-webpage resource stored in the client.

With reference to the fourth aspect, in a first possible implementation manner, the sending module is further configured to send a time indication to the server, where the time indication is time information of the first-webpage resource stored in the client. The receiving module is further configured to receive a latest resource that is sent by the server and that is corresponding to a resource that needs to be updated in the first-webpage resource, where the resource that needs to be updated in the first-webpage resource is determined by the server according to the time indication.

With reference to the first possible implementation manner, in a second possible implementation manner, the time indication is any one of the types, the time indication is a time at which the client accesses the first webpage last time, the time indication is a time at which each resource in the first-webpage resource stored in the client is stored, or the time indication is a time at which the server modifies the first webpage and that is received when the client accesses the first webpage last time.

With reference to the first possible implementation manner or the second possible implementation manner, in a third possible implementation manner, the receiving module is further configured to receive time information sent by the server, where the time information is a time at which the server modifies the first-webpage resource the most recent time, and the sending module is further configured to send the time indication to the server when the client determines that a time indicated by the time information is later than a time indicated by the time indication.

With reference to any one of the fourth aspect, or the first to the third possible implementation manners of the fourth aspect, in a fourth possible implementation manner, the apparatus further includes the receiving module that is further configured to receive names that are of all the resources required for loading the first-webpage resource and that are sent by the server, and a determining module configured to determine, according to the names of all the resources required for loading the first webpage, the name of the first-webpage resource stored in the client.

With reference to any one of the fourth aspect, or the first to the fourth possible implementation manners of the fourth aspect, in a fifth possible implementation manner, the sending module is further configured to send, to the server, a name of a second-webpage resource stored in the client, where the first webpage and the second webpage are located on a same website. The receiving module is further configured to receive a second push resource sent by the server, where the second push resource is all resources required for loading the second webpage apart from the first push resource and the second-webpage resource stored in the client. The loading module is further configured to load the second webpage according to the second push resource and the second-webpage resource stored in the client.

A fifth aspect of the embodiments of the present disclosure provides a webpage loading apparatus, including a receiver configured to receive an address of a first webpage and a name of a first-webpage resource and that is stored in a client, where the address and the name are sent by the client, and the first webpage is a webpage that the client currently requests to access. A processor configured to determine, according to the address of the first-webpage resource, names of all resources required for loading the first webpage, and determine a first push resource according to the name of the first-webpage resource stored in the client and the names of all the resources required for loading the first webpage, where the first push resource is all the resources required for loading the first webpage apart from the first-webpage resource stored in the client. A transmitter configured to send the first push resource to the client.

With reference to the fifth aspect, in a first possible implementation manner, the receiver is further configured to receive a time indication sent by the client, where the time indication is time information of the first-webpage resource stored in the client. The processor is further configured to determine, according to the time indication, a resource that needs to be updated in the first-webpage resource stored in the client, and determine a latest resource corresponding to the resource that needs to be updated, and the transmitter is further configured to send the latest resource to the client.

With reference to the first possible implementation manner, in a second possible implementation manner, the time indication is a time at which the client accesses the first webpage last lime, and the processor is further configured to determine, according to the time at which the client accesses the first webpage last time, the resource that needs to be updated in the first-webpage resource stored in the client.

With reference to the first possible implementation manner, in a third possible implementation manner, the time indication is a time at which the server modifies the first-webpage resource and that is received when the client accesses the first webpage last time, and the processor is further configured to determine, according to the time at which the server modifies the first-webpage resource and that is received when the client accesses the first webpage last time, the resource that needs to be updated in the first-webpage resource stored in the client.

With reference to the first possible implementation manner, in a fourth possible implementation manner, the time indication is a time at which each resource in the first-webpage resource stored in the client is stored, and the processor is configured to determine, according to the time at which each resource in the first-webpage resource stored in the client is stored, the resource that needs to be updated in the first-webpage resource stored in the client.

With reference to any one of the fifth aspect, or the first to the fourth possible implementation manners of the fifth aspect, in a fifth possible implementation manner, the transmitter is further configured to send, to the client, the names of all the resources required for loading the first webpage, such that the client determines, according to the names of all the resources required for loading the first webpage, the name of the first-webpage resource stored in the client.

With reference to any one of the fifth aspect, or the first to the fifth possible implementation manners of the fifth aspect, in a sixth possible implementation manner, the receiver is further configured to receive a name, sent by the client, of a second-webpage resource stored in the client, where the first webpage and the second webpage are located on a same website. The processor is further configured to determine, according to a preset rule, an address of the second webpage to be accessed by the client, determine, according to the address of the second webpage, names of all resources required for loading the second webpage, and determine a second push resource according to the names of all the resources required for loading the second webpage, the name of the second-webpage resource stored in the client, and the first push resource, where the second push resource is all the resources required for loading the second webpage apart from the first push resource and the second-webpage resource stored in the client. The transmitter is further configured to send the second push resource to the client.

A sixth aspect of the embodiments of the present disclosure provides a webpage loading apparatus, where the webpage loading apparatus is a client, and includes a transmitter configured to send, to a server, an address of a first webpage and a name of a first-webpage resource stored in the client, where the first webpage is a webpage that the client currently requests to access. A receiver configured to receive a first push resource sent by the server, where the first push resource is all resources required for loading the first webpage apart from the first-webpage resource stored in the client. A loader configured to load the first webpage according to the first push resource and the first-webpage resource stored in the client.

With reference to the sixth aspect, in a first possible implementation manner, the transmitter is further configured to send a time indication to the server, where the time indication is time information of the first-webpage resource stored in the client. The receiver is further configured to receive a latest resource that is sent by the server and that is corresponding to a resource that needs to be updated in the first-webpage resource, where the resource that needs to be updated in the first-webpage resource is determined by the server according to the time indication.

With reference to the first possible implementation manner, in a second possible implementation manner, the time indication is any one of the types, the time indication is a time at which the client accesses the first webpage last time, the time indication is a time at which each resource in the first-webpage resource stored in the client is stored, or the time indication is a time at which the server modifies the first webpage and that is received when the client accesses the first webpage last time.

With reference to the first possible implementation manner or the second possible implementation manner, in a third possible implementation manner, the receiver is further configured to receive time information sent by the server, where the time information is a time at which the server modifies the first-webpage resource the most recent time, and the transmitter is further configured to send the time indication to the server when the client determines that a time indicated by the time information is later than a time indicated by the time indication.

With reference to any one of the sixth aspect, or the first to the third possible implementation manners of the sixth aspect, in a fourth possible implementation manner, the apparatus further includes the receiver that is further configured to receive names that are of all the resources required for loading the first-webpage resource and that are sent by the server. A processor configured to determine, according to the names of all the resources required for loading the first webpage, the name of the first-webpage resource stored in the client.

With reference to any one of the sixth aspect, or the first to the fourth possible implementation manners of the sixth aspect, in a fifth possible implementation manner, the transmitter is further configured to send, to the server, a name of a second-webpage resource stored in the client, where the first webpage and the second webpage are located on a same website. The receiver is further configured to receive a second push resource sent by the server, where the second push resource is all resources required for loading the second webpage apart from the first push resource and the second-webpage resource stored in the client, and the loader is further configured to load the second webpage according to the second push resource and the second-webpage resource stored in the client.

According to the webpage loading method and apparatus provided in the embodiments of the present disclosure, in addition to sending an address of a first webpage to a server, a client further sends, to the server, a name of a first-webpage resource stored in the client, where the first webpage is a webpage that the client currently requests to access, such that the server can determine, according to the address of the first webpage, names of all resources required for loading the first webpage, and determine, according to the name of the first-webpage resource stored in the client and the names of all the resources required for loading the first webpage, a first push resource to be sent to the client, where the first push resource is all the resources required for loading the first webpage apart from the first-webpage resource stored in the client, that is, the first push resource does not include the first-webpage resource stored in the client, but includes only a first-webpage resource that is not locally stored in the client, which avoids pushing, by the server to the client, a resource that has been locally stored in the client, and therefore saves a bandwidth resource of a communications network.

BRIEF DESCRIPTION OF DRAWINGS

To describe technical solutions in embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes technical solutions in embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

In the specification, claims, and accompanying drawings of the present disclosure, the terms "first," "second," "third," "fourth," and so on (if existent) are intended to distinguish between similar objects but do not necessarily indicate a specific order or sequence. It should be understood that the data termed in such a way is interchangeable in proper circumstances such that the embodiments of the present disclosure described herein can, for example, be implemented in orders except the order illustrated or described herein. Moreover, the terms "include," "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

Figure 1:
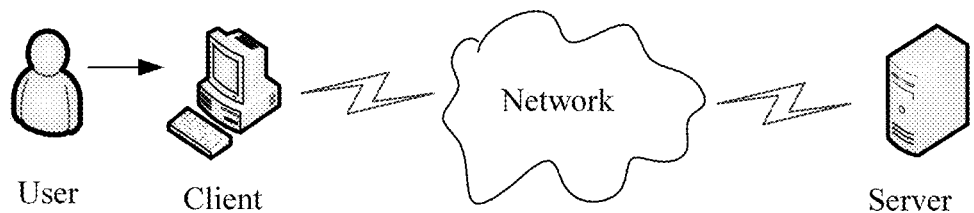
FIG. 1 is an architectural diagram of a B/S system according to an embodiment of the present disclosure.

FIG. 1 is an architectural diagram of a B/S system according to an embodiment of the present disclosure. As shown in FIG. 1, the architecture includes a client and a server. The client described in each embodiment of the present disclosure refers to an application program of the client, including a browser or a control, a component, a module, software or the like that can acquire a webpage. The foregoing client may be installed on a terminal, such as a desktop computer, a notebook, or a mobile phone, where the client is used to respond to an operation of a user. The client and the server perform information interaction using a network, for example the user inputs, to the client, a website of a webpage requested to be accessed, or clicks a link on a webpage. The client sends a request to the server using the network. The server returns a requested resource to the client using the network, and the client loads the webpage that the user requests to access after receiving the resource sent by the server, and presents the webpage to the user using the client.

Using a method in other approaches, each time the client requests to access a webpage, the server sends, to the client, all resources required for loading the webpage requested to be accessed, which causes a waste of a bandwidth resource. However, in this embodiment of the present disclosure, in addition to sending an address of a first webpage to the server, the client further sends, to the server, a name of a first-webpage resource stored in the client, where in the present disclosure, a webpage that the client currently requests to access is referred to as the first webpage. That is, the client reports, to the server, a situation of a resource that is of the webpage currently requested to be accessed and that has been locally stored in the client, such that the server determines, according to the address of the first webpage, names of all resources required for loading the first webpage, and determines, according to the name of the first-webpage resource stored in the client and the names of all the resources required for loading the first webpage, a first push resource to be sent to the client, where the first push resource is all the resources required for loading the first webpage apart from the first-webpage resource stored in the client, that is, the first push resource that is sent to the client by the server does not include the first-webpage resource that has been locally stored in the client, but includes only a first-webpage resource that is not locally stored in the client, and the client loads the first webpage according to the first push resource and the first-webpage resource stored in the client. A situation of the first-webpage resource that has been locally stored in the client is referenced when the server determines the first push resource, and the first-webpage resource that has been locally stored in the client is not sent to the client, a bandwidth resource is saved.

The following describes in detail the technical solutions in the present disclosure using specific embodiments. The following several specific embodiments may be combined with each other, and a same or similar concept or process may not be described in some embodiments.

Figure 2:
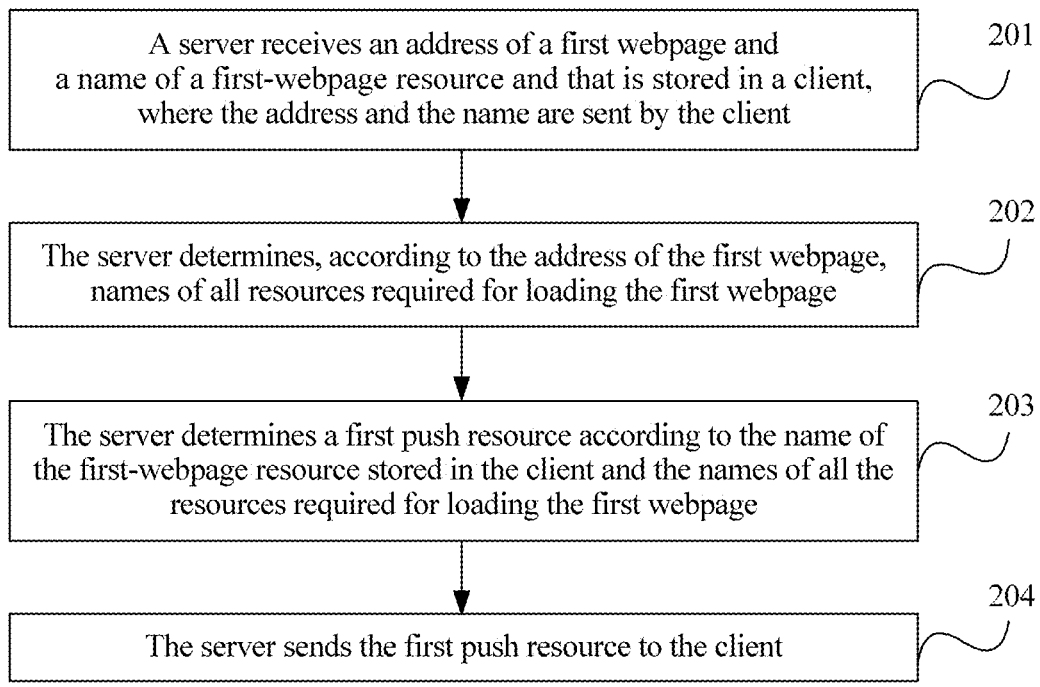
FIG. 2 is a schematic flowchart of Embodiment 1 of a webpage loading method according to the present disclosure.

FIG. 2 is a schematic flowchart of Embodiment 1 of a webpage loading method according to the present disclosure. This embodiment is executed by a server. As shown in FIG. 2, the method in this embodiment is as follows.

Step 201: The server receives an address of a first webpage and a name of a first-webpage resource and that is stored in a client, where the address and the name are sent by the client.

The first webpage is a webpage that the client currently requests to access.

The client may include, in a message, the address of the first webpage and the name of the first-webpage resource stored in the client for sending to the server, for example, the address of the first webpage and the name of the first-webpage resource stored in the client may be included in an HTTP request message, and the address of the first webpage may be a uniform resource locator (URL). The client may also send, to the server using different messages, the address of the first webpage and the name of the first-webpage resource stored in the client, which is not limited in the present disclosure.

The name of the foregoing first-webpage resource can uniquely identify a resource, that is, a name and a resource are in one-to-one correspondence. Generally, a uniform resource identifier (URI) of a stored resource may be used as a name of a resource, for example, a relative URI "images/ logo.png,css/site.css,js/main.js" may be used to represent a name of a resource, or a parameter that can uniquely identify a resource may also be used as a name of the resource, for example, "?userid=A&photo=big" may be used to represent a name of a resource of a big photo of a user A, and "?userid=B&photo=small" may be used as a name of a resource of a small photo of a user B. The present disclosure imposes no limitation on this.

The first-webpage resource stored in the client may have zero name, or one or more than one name. Names may be represented using a list, an array, a character string, an Extensible Markup Language (XML) file or another data structure when the first-webpage resource has more than one name, which is not limited in the present disclosure.

It should be noted that the name of the first-webpage resource stored in the client may be determined in multiple manners. A manner may include that the client determines the name of the first-webpage resource stored in the client and sends the name to the server, for example, the client determines the name of the first-webpage resource according to an attribute of a locally stored resource, and the attribute of the resource includes an expression of a webpage to which the resource belongs, or the client may store in advance names of all resources in the first-webpage resource, or request, from the server, names of all resources of the first webpage, and determine, according to the names of all the resources of the first webpage, the name of the first-webpage resource stored in the client, or the client may further send, to the server, all names of all locally stored resources of a website on which the first webpage is located, and the server determines the name of the first-webpage resource stored in the client. The present disclosure imposes no limitation on this, as long as resource names sent to the server by the client include the name of the first-webpage resource stored in the client.

Step 202: The server determines, according to the address of the first webpage, names of all resources required for loading the first webpage.

The server may learn, according to a relationship between webpage addresses stored in the server and the names of all the resources required for loading the webpage, the names of all the resources required for loading the first webpage.

Step 203: The server determines a first push resource according to the name of the first-webpage resource stored in the client and the names of all the resources required for loading the first webpage.

The first push resource is all the resources required for loading the first webpage apart from the first-webpage resource stored in the client, that is, all the resources required for loading the first webpage apart from the first-webpage resource stored in the client.

For example, names of all resources required for loading the first webpage are name 1, name 2, name 3, name 4, and name 5, and names of the first-webpage resource stored in the client are name 1, name 2, and name 4. Then first push resources are resources corresponding to name 3 and name 5.

Step 204: The server sends the first push resource to the client.

The server sends the foregoing first push resource to the client, such that the client acquires, according to the first push resource and the first-webpage resource locally stored in the client, all the resources required for loading the first webpage, to load the first webpage.

Optionally, when the client does not know which locally stored resource belongs to the first webpage, the server may further send, to the client, the names of all the resources required for loading the first webpage, such that the client determines the name of the first-webpage resource according to the names of all the resources required for loading the first webpage.

In this embodiment, a server receives an address of a first webpage and a name of a first-webpage resource and that is stored in a client, where the address and the name are sent by the client, determines, according to the address of the first webpage, names of all resources required for loading the first webpage, determines a first push resource according to the name of the first-webpage resource stored in the client and the names of all the resources required for loading the first webpage, where the first push resource is all the resources required for loading the first webpage apart from the first-webpage resource stored in the client, and sends the first push resource to the client, such that the client loads the first webpage according to the names of all the resources required by the first webpage, the first push resource, and the name of the first-webpage resource stored in the client. That is, when the server determines the first push resource, a situation of the first-webpage resource that has been locally stored in the client is referenced, and the first-webpage resource that has been locally stored in the client is not sent to the client, which avoids pushing, by the server to the client, a resource that has been locally stored in the client, and therefore saves a bandwidth resource of a communications network.

Figure 3:
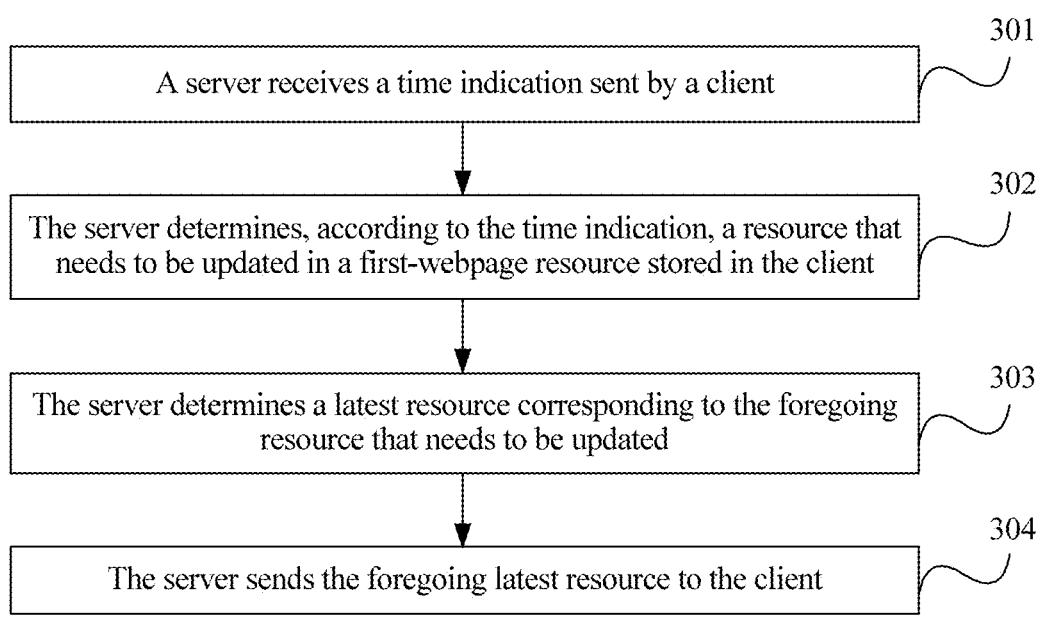
FIG. 3 is a schematic flowchart of Embodiment 2 of a webpage loading method according to the present disclosure.

Although the client can store a resource of a webpage, a server side may update the resource of the webpage. A situation in which some resources of a loaded webpage are not the latest may be caused when the client does not synchronously update the foregoing resource. To overcome the foregoing problem, the present disclosure further provides a webpage loading method, and verifying whether the first-webpage resource stored in the client is a latest resource is added to the method. The server side may also send, to the client, a latest resource corresponding to a resource that needs to be updated in order to ensure that all resources loaded by the client are latest resources when the first-webpage resource stored in the client has the resource that needs to be updated. As shown in FIG. 3, FIG. 3 is a schematic flowchart of Embodiment 2 of a webpage loading method according to the present disclosure, and steps shown in FIG. 3 are additional steps based on the embodiment shown in FIG. 2.

Step 301: The server receives a time indication sent by the client.

The time indication is time information of the first-webpage resource stored in the client.

A specific form of the time indication may include a time at which the client accesses the first webpage last time, a time at which the server modifies the first-webpage resource and that is received when the client accesses the first webpage last time, or the time indication is a time at which each resource in the first-webpage resource stored in the client is stored.

Step 302: The server determines, according to the time indication, a resource that needs to be updated in the first-webpage resource stored in the client.

Further, when the time indication is a time at which the client accesses the first webpage last time, when the time at which the client accesses the first webpage last time is earlier than a time at which the server modifies the first-webpage resource the most recent time, the server determines that a resource corresponding to a name that is in names of resources modified after the time at which the client accesses the first webpage last time and that is the same as the name of the first-webpage resource stored in the client is the resource that needs to be updated. For example, resources required for loading the first webpage are resources corresponding to name 1, name 2, name 3, name 4, and name 5, and a time at which the client accesses the first webpage last time is "January 3, 2014 3:52." The server modifies the first-webpage resource after the time at which the client accesses the first webpage last time, a time of the modification is "February 3, 2014 3:00," and a modified resource is a resource corresponding to name 4. Then it may be determined that the time at which the client accesses the first webpage last time is earlier than a time at which the server modifies the first-webpage resource the most recent time, and the server determines that the resource modified after the time at which the client accesses the first webpage last time is the resource corresponding to name 4. The first-webpage resources stored in the client are resources corresponding to name 1, name 2, and name 4, and then it may be determined that the resource corresponding to name 4 is the resource that needs to be updated.

When the time indication is a time at which the server modifies the first-webpage resource and that is received when the client accesses the first webpage last time, for ease of description, in this embodiment, a time at which the server modifies the first-webpage resource the most recent time and that is received when the client accesses the first webpage last time is referred to as a first time. A most recent time that is relative to a current time and at which the server modifies the first-webpage resource is referred to as a second time. The server determines that a resource corresponding to a name that is in names of resources modified after the first time and that is the same as the name of the first-webpage resource stored in the client is the resource that needs to be updated when the second time is later than the first time. That is, each time the client requests to access a webpage, the server may inform the client of a time at which a resource of the webpage requested to be accessed is modified the most recent time, for example, when the client requests to access a webpage, the server carries the following information in a response message.

"Etag "427fe7b6442f2096dff4f92339305444" Last-Modified Fri, 04 Sep 2009 05:55:43 GMT," which is the server informs the client that an "Etag" of a webpage to be accessed by the client is "427fe7b6442f2096dff4f92339305444," and a time at which the server modifies the webpage the most recent time is "Fri, 04 Sep 2009 05:55:43." Then the client may store the foregoing information into a local storage, and send the foregoing information to the server in next access, such that the server determines, according to the foregoing information, whether a resource that is of the webpage requested to be accessed stored in the client is a latest resource. Specific information sent to the server by the client is as follows.

"If-None-Match "427fe7b6442f2096dff4f92339305444" If-Modified-Since Fri, 03 Jan 2014 05:55:43 GMT," which is the client informs the server that the "Etag" of the resource that is of the webpage requested to be accessed and that is locally stored in the client is "427fe7b6442f2096dff4f92339305444," and a time of the most recent modification is "Fri, 03 Jan 2014 05:55:43 GMT,", and the client checks whether the server side modifies, after the client accesses a to-be-accessed webpage last time, the resource of the webpage requested to be accessed. Then the server determines that a resource corresponding to a name that is in names of resources modified after the first time and that is the same as the name of the first-webpage resource stored in the client is the resource that needs to be updated. For example, resources required for loading the first webpage are resources corresponding to name 1, name 2, name 3, name 4, and name 5, and first-webpage resources stored in the client are resources corresponding to name 1, name 2, and name 4. A time at which the server modifies the first-webpage resource the most recent time and that is received when the client accesses the first webpage last time is "Fri, 03 Jan 2014 05:55:43 GMT," which is referred to as a first time. The server modifies the first-webpage resource after "Fri, 03 Jan 2014 05:55:43 GMT," a time of the modification is "Fri, 25 Feb 2014 05:55:43 GMT," and a modified resource is a resource corresponding to name 4. A time at which the server modifies the first-webpage resource the most recent time is referred to as a second time, and the second time is later than the first time. A name that is in names of the resources modified by the server after the first time and that is the same as the name of the first-webpage resource stored in the client is name 4, and then it is determined that the resource corresponding to name 4 is the resource that needs to be updated.

When the time indication is a time at which each resource in the first-webpage resource stored in the client is stored, for a name of each resource in the first-webpage resource stored in the client, when a time at which a resource corresponding to a name is stored is earlier than a time at which the server modifies the resource corresponding to the name the most recent time, the server determines that the resource corresponding to the name is the resource that needs to be updated. For example, first-webpage resources are resources corresponding to name 1, name 2, name 3, name 4, and name 5, first-webpage resources stored in the client are resources corresponding to name 1, name 2, and name 4, and storage times are all Mar. 1, 2014, a time at which the server modifies the resources corresponding to name 1 and name 2 the most recent time are Feb. 15, 2014, a time at which the server modifies the resource corresponding to name 4 the most recent time is Mar. 5, 2014, and then it is determined that the resource corresponding to name 4 is the resource that needs to be updated.

Step 303: The server determines a latest resource corresponding to the foregoing resource that needs to be updated.

The server determines, on the server side, the latest resource corresponding to the resource that needs to be updated.

Step 304: The server sends the foregoing latest resource to the client.

The latest resource is a resource obtained after the server modifies a resource the most recent time, for example, a time at which the server modifies a resource corresponding to name 5 the most recent time is Feb. 3, 2014 3:00, then a resource obtained after the resource corresponding to name 5 is modified at 3:00, Feb. 3, 2014 is the latest resource.

In this embodiment, a server receives the time indication sent by the client, and determines, according to the time indication, a resource that needs to be updated in the first-webpage resource stored in the client, and the server determines a latest resource corresponding to the resource that needs to be updated, and the server sends the latest resource to the client in order to ensure that a resource required for loading the first webpage by the client is a latest resource.

After acquiring, from the server in the foregoing implementation manner, the latest resource corresponding to the resource that needs to be updated, the client updates the resource that is locally stored before to the latest resource. In the foregoing manner, it may be ensured that all first-webpage resources loaded by the client are latest resources.

It should be noted that steps shown in FIG. 3 are additional steps based on the embodiment shown in FIG. 2. The client may include the time information and the address of the first webpage into a message for sending to the server, or may separately send the time information and the address of the first webpage to the server. The server sends, to the client, the latest resource corresponding to the resource that needs to be updated, or may send the latest resource to the client together with the first push resource, or may separately send the latest resource and the first push resource to the client. The present disclosure imposes no limitation on a specific manner of sending the foregoing information.

Before a technical solution in the embodiment shown in FIG. 3 is executed, the method may further include the following steps. The server sends, to the client, a time at which the server modifies the first-webpage resource the most recent time, and the technical solution shown in FIG. 3 is executed when the client determines that the most recent time that is sent by the server and at which the first-webpage resource is modified is later than a time indicated by any one of the foregoing time indications, or the technical solution shown in FIG. 3 is not executed when the most recent time that is sent by the server and at which the first-webpage resource is modified is not later than a time indicated by any one of the foregoing time indications, which may ensure that all loaded first-webpage resources are latest resources, and therefore further reduce unnecessary signaling interaction.

In the foregoing embodiments, some servers support webpage loading using the technical solution in the present disclosure, and some servers do not support webpage loading using the technical solution in the present disclosure. Therefore, the present disclosure further provides an embodiment in which the client determines whether the server supports webpage loading using the technical solution in the present disclosure, that is the client determines whether the server supports determining, according to the name of the first-webpage resource stored in the client and the names of all the resources required for loading the first webpage, the first push resource to be sent to the client.

Further, the server receives a protocol support capability request sent by the client, where the protocol support capability request is used to request whether the server supports determining, according to the name of the first-webpage resource stored in the client and the names of all the resources required for loading the first webpage, the first push resource to be sent to the client. The server sends a protocol support capability response to the client according to a protocol support capability of the server, such that the client determines, according to the protocol support capability response, whether the server supports the foregoing technical solution in the present disclosure.

One implementation manner includes that the client sends the protocol support capability request to the server, which may be implemented by adding a protocol support query field to a message sent to the server, where the protocol support query field is used to query whether the server supports determining, according to the name of the first-webpage resource stored in the client and the names of all the resources required for loading the first webpage, the first push resource to be sent to the client. The server sends the protocol support capability response to the client according to the protocol support capability of the server, which may be implemented by carrying or not carrying a protocol support response field in a message sent to the client, and the protocol support response field is carried in the message sent to the client when the server supports determining, according to the name of the first-webpage resource stored in the client and the names of all the resources required for loading the first webpage, the first push resource to be sent to the client, or the protocol support response field is not carried in the message sent to the client when the server does not support determining, according to the name of the first-webpage resource stored in the client and the names of all the resources required for loading the first webpage, the first push resource to be sent to the client. Then the client may determine, according to whether the message sent by the server carries the protocol support response field, whether the server supports determining, according to the name of the first-webpage resource stored in the client and the names of all the resources required for loading the first webpage, the first push resource to be sent to the client. For example, the protocol support query field may be "Cached-Subresources," and the client adds the foregoing field to the message sent to the server. When the message sent by the server includes the "Cached-Subresources" field, it means that the server supports the technical solution in the present disclosure. It should be noted that the protocol support query field and the protocol support response field may be the same or may be different, which is not limited in the present disclosure.

Another implementation manner includes that the client sends the protocol support capability request to the server, which may be implemented by adding a protocol support query field to a message sent to the server, where the protocol support query field is used to query whether the server supports determining, according to the name of the first-webpage resource stored in the client and the names of all the resources required for loading the first webpage, the first push resource to be sent to the client. The server sends the protocol support capability response to the client according to the protocol support capability of the server, which may be implemented by a value of a protocol support response field carried in a message sent to the client, and the protocol support response field is carried in the message sent to the client, and a value of the protocol support response field indicates support when the server supports determining, according to the name of the first-webpage resource stored in the client and the names of all the resources required for loading the first webpage, the first push resource to be sent to the client, or the protocol support response field is not carried in the message sent to the client, and a value of the protocol support response field indicates no support when the server does not support determining, according to the name of the first-webpage resource stored in the client and the names of all the resources required for loading the first webpage, the first push resource to be sent to the client. Then the client may determine, according to the value of the protocol support response field carried in the message sent by the server, whether the server supports determining, according to the name of the first-webpage resource stored in the client and the names of all the resources required for loading the first webpage, the first push resource to be sent to the client. For example, the protocol support query field may be "Cached-Subresources," and the client adds the foregoing field to the message sent to the server. When the message sent by the server includes the "Cached-Subresources" field, and a value of the "Cached-Subresources" indicates support, for example, "Cached-Subresources: OK," it means that the server supports the technical solution in the present disclosure. It should be noted that the protocol support query field and the protocol support response field may be the same or may be different, and "OK," "YES," or the like may be used to indicate support, which is not limited in the present disclosure.

In the foregoing implementation manner provided in the present disclosure, a client may determine whether a server supports determining, according to a name of a resource that is of a first webpage stored in the client and names of all resources required for loading the first webpage, a first push resource to be sent to the client. The client determines, according to a determining result, whether to wait for the server to push a resource or actively request a resource using an existing technology. The client waits for the server to push a resource when the server supports determining, according to a name of a resource that is of a first webpage stored in the client and names of all resources required for loading the first webpage, a first push resource to be sent to the client, or the client actively requests, from the server, the resource using the existing technology when the server does not support determining, according to a name of a resource that is of a first webpage stored in the client and names of all resources required for loading the first webpage, a first push resource to be sent to the client, thereby implementing compatibility with a conventional webpage loading technology.

Figure 4:
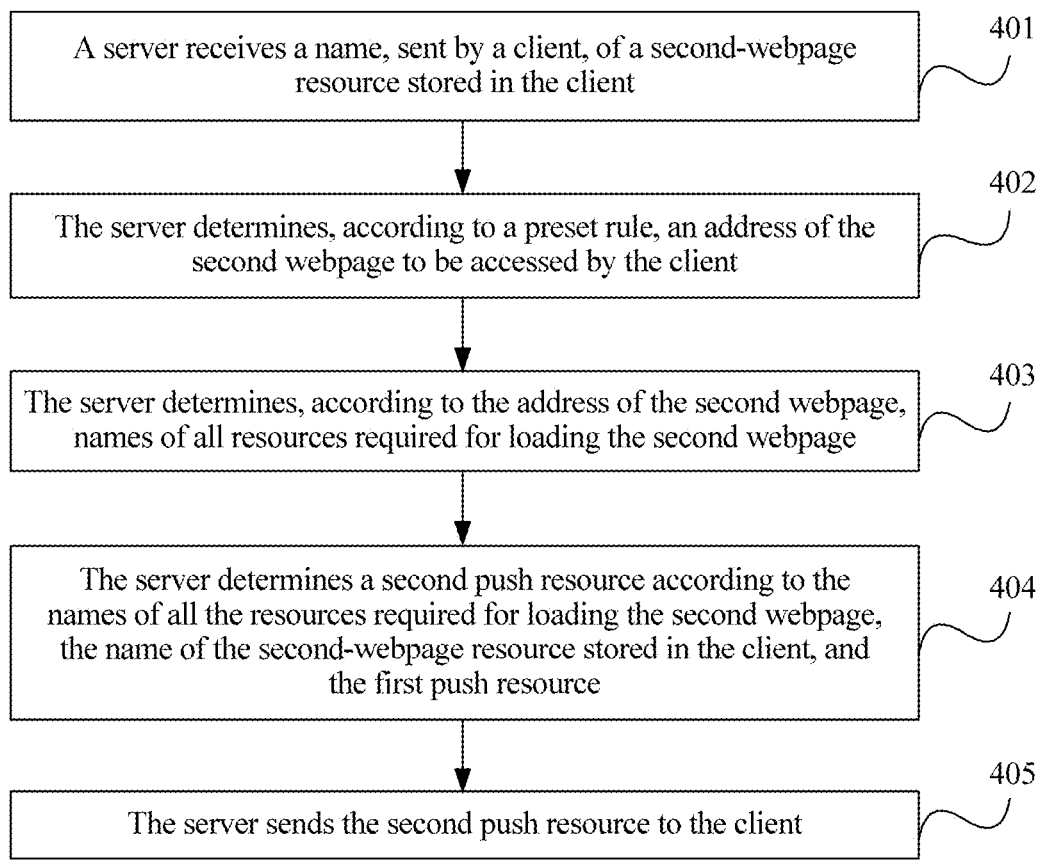
FIG. 4 is a schematic flowchart of Embodiment 3 of a webpage loading method according to the present disclosure.

Generally, there is a rule in accessing a webpage by the client. Generally, the client may continuously access different webpages that belong to a same website, and the server may learn this access rule by a technical means such as statistics collection. Therefore, to improve efficiency of loading webpages of an entire website by the client, further, as shown in FIG. 4, FIG. 4 is a schematic flowchart of Embodiment 3 of a webpage loading method according to the present disclosure, and steps in FIG. 4 are additional steps based on the embodiment shown in FIG. 2 or FIG. 3.

Step 401: The server receives a name, sent by the client, of a second-webpage resource stored in the client.

The first webpage and the second webpage are located on a same website.

The server receives the name, sent by the client, of the second-webpage resource that is stored in the client and that is of a website on which the first webpage is located. The second webpage is a webpage that the client may possibly continue to access after accessing the first webpage, where the name of the second-webpage resource of the website on which the first webpage is located and the name of the first-webpage resource are generally included in a same message for sending to the server.

Step 402: The server determines, according to a preset rule, an address of the second webpage to be accessed by the client.

The server may determine, by a means such as statistics collection, an address of a webpage that the client continues to access after accessing the first webpage, that is, determine the address of the second webpage.

Step 403: The server determines, according to the address of the second webpage, names of all resources required for loading the second webpage.

Step 404: The server determines a second push resource according to the names of all the resources required for loading the second webpage, the name of the second-webpage resource stored in the client, and the first push resource.

The second push resource is all the resources required for loading the second webpage apart from the first push resource and the second-webpage resource stored in the client. That is, the second push resource includes neither the second-webpage resource stored in the client nor the first push resource.

Step 405: The server sends the second push resource to the client.

In this embodiment, a server predicts an address of a second webpage that a client continues to access after accessing a first webpage, and determines a second push resource according to a name, sent by the client, of a second-webpage resource that is stored in the client and that is of a website on which the first webpage is located, names of all resources required for loading the second webpage, and a first push resource. Before the client accesses the second webpage, the second push resource is sent in advance to the client, such that when the client accesses the second webpage, loading efficiency is improved, thereby improving efficiency of loading webpages of an entire website.

Generally, the client reports information about a resource locally stored in the client only when accessing a first webpage of a website, and when requesting to access a subsequent webpage of a same website, the client no longer reports the information about the resource locally stored in the client. The server pre-pushes a resource to the client according to the information that is about the resource locally stored in the client and that is reported when the client requests to access the first webpage, or pushes a resource to the client after receiving a website of the subsequent webpage requested to be accessed. The foregoing first webpage is a first webpage that the client requests to access when accessing webpages of a website within a time range from opening of a browser to closing of the browser, or is a first webpage that the client requests to access when accessing a website during a preset period of time, which is not limited in the present disclosure.

Figure 5:
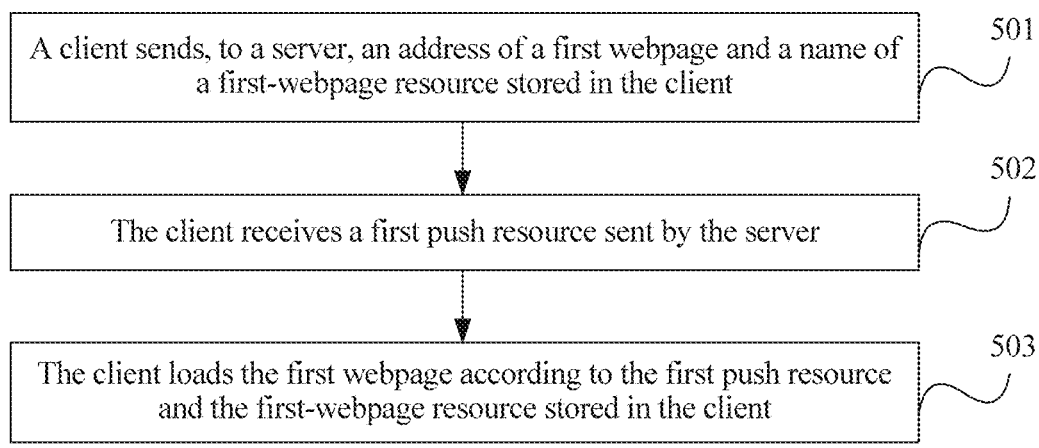
FIG. 5 is a schematic flowchart of Embodiment 4 of a webpage loading method according to the present disclosure.

FIG. 5 is a schematic flowchart of Embodiment 4 of a webpage loading method according to the present disclosure. This embodiment is executed by a client. As shown in FIG. 5, the method in this embodiment includes the following steps.

Step 501: The client sends, to a server, an address of a first webpage and a name of a first-webpage resource stored in the client.

The first webpage is a webpage that the client currently requests to access.

It should be noted that the name of the first-webpage resource stored in the client may be determined in multiple manners. A manner may include that the client determines the name of the first-webpage resource stored in the client and sends the name to the server, for example, the client determines the name of the first-webpage resource according to an attribute of a locally stored resource, and the attribute of the resource includes an expression of a webpage to which the resource belongs, or the client may store in advance names of all resources in the first-webpage resource, or request, from the server, names of all resources of the first webpage, and determine, according to the names of all the resources of the first webpage, the name of the first-webpage resource stored in the client, or the client may further send, to the server, all names of all locally stored resources of a website on which the first webpage is located, and the server determines the name of the first-webpage resource stored in the client. The present disclosure imposes no limitation on this, as long as resource names sent to the server by the client include the name of the first-webpage resource stored in the client.

For detailed description of this step, refer to step 201 in the embodiment shown in FIG. 2, and details are not described herein.

Step 502: The client receives a first push resource sent by the server.

The first push resource is all resources required for loading the first webpage apart from the first-webpage resource stored in the client, that is, all resources required for loading the first webpage apart from the first-webpage resource stored in the client.

For detailed description of this step, refer to step 202, step 203, and step 204 in the embodiment shown in FIG. 2, and details are not described herein.

Optionally, the server may further send, to the client, the names of all the resources required for loading the first webpage when the client does not know which locally stored resource belongs to the first webpage, and the client receives the names that are sent by the server and that are of all the resources required for loading the first webpage, and determines the name of the stored first-webpage resource according to the names of all the resources required for loading the first webpage.

Step 503: The client loads the first webpage according to the first push resource and the first-webpage resource stored in the client.

In this embodiment, a client sends, to a server, an address of a first webpage and a name of a first-webpage resource stored in the client, such that the server determines, according to the address of the first webpage, names of all resources required for loading the first webpage, and determines a first push resource according to the name of the first-webpage resource stored in the client and the names of all the resources required for loading the first webpage, where the first push resource is all the resources required for loading the first webpage apart from the first-webpage resource stored in the client, and the client receives the first push resource sent by the server, and loads the first webpage according to the first push resource and the first-webpage resource stored in the client. That is, a situation of the first-webpage resource that has been locally stored in the client is referenced, and the first-webpage resource that has been locally stored in the client is not sent to the client when the server determines the first push resource, which avoids pushing, by the server to the client, a resource that has been locally stored in the client, and therefore saves a bandwidth resource of a communications network.

Figure 6:
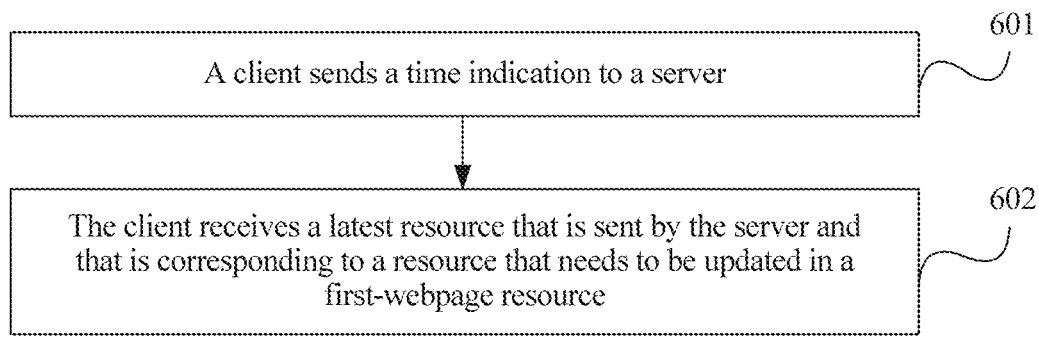
FIG. 6 is a schematic flowchart of Embodiment 5 of a webpage loading method according to the present disclosure.

Although the client can store a resource of a webpage, a server side may update the resource of the webpage. A situation in which some resources of a loaded webpage are not the latest may be caused when the client does not synchronously update the foregoing resource. To overcome the foregoing problem, the present disclosure further provides a webpage loading method, and verifying whether the first-webpage resource stored in the client is a latest resource is added to the method. When the first-webpage resource stored in the client has a resource that needs to be updated, the server side may also send, to the client, a latest resource corresponding to the resource that needs to be updated in order to ensure that all resources loaded by the client are latest resources. As shown in FIG. 6, FIG. 6 is a schematic flowchart of Embodiment 5 of a webpage loading method according to the present disclosure, and steps shown in FIG. 6 are additional steps based on the embodiment shown in FIG. 5.

Step 601: The client sends a time indication to the server.

The time indication is time information of the first-webpage resource stored in the client.

The time indication is any one of the types, the time indication is a time at which the client accesses the first webpage last time, the time indication is a time at which each resource in the first-webpage resource stored in the client is stored, or the time indication is a time at which the server modifies the first webpage and that is received when the client accesses the first webpage last time.

Step 602: The client receives a latest resource that is sent by the server and that is corresponding to a resource that needs to be updated in the first-webpage resource.

The resource that needs to be updated in the first-webpage resource is determined by the server according to the time indication. For a specific determining method, refer to detailed description in the embodiment shown in FIG. 3, and details are not described herein.

In this embodiment, a client sends the time indication to a server, such that the server determines, according to the time indication, the resource that needs to be updated in the first-webpage resource stored in the client, and the server sends, to the client, the latest resource corresponding to the resource that needs to be updated in order to ensure that all resources required for loading the first webpage by the client are latest resources.

After acquiring, from the server in the foregoing implementation manner, the latest resource corresponding to the resource that needs to be updated, the client updates the resource that needs to be updated and that is locally stored before to the latest resource. In the foregoing manner, it may be ensured that all first-webpage resources loaded by the client are latest resources.

It should be noted that steps shown in FIG. 6 are additional steps based on the embodiment shown in FIG. 5. The client may include the time information and the address of the first webpage into a message for sending to the server, or may separately send the time information and the address of the first webpage to the server. The server sends, to the client, the latest resource corresponding to the resource that needs to be updated, or may send the latest resource to the client together with the first push resource, or may separately send the latest resource and the first push resource to the client. The present disclosure imposes no limitation on a specific manner of sending the foregoing information.

Before a technical solution in the embodiment shown in FIG. 6 is executed, the method may further include the following steps. The client receives time information sent by the server, where the time information here is a time at which the server modifies the first-webpage resource the most recent time, and the technical solution shown in FIG. 5 is executed when the client determines that the most recent time that is sent by the server and at which the first-webpage resource is modified is later than a time indicated by any one of the foregoing time indications, or the technical solution shown in FIG. 5 is not executed when the most recent time that is sent by the server and at which the first-webpage resource is modified is not later than a time indicated by any one of the foregoing time indications, which may ensure that all loaded first-webpage resources are latest resources, and therefore further reduce unnecessary signaling interaction.

In the foregoing embodiments, some servers support webpage loading using the technical solution in the present disclosure, and some servers do not support webpage loading using the technical solution in the present disclosure. Therefore, the present disclosure further provides an embodiment in which the client determines whether the server supports webpage loading using the technical solution in the present disclosure, that is the client determines whether the server supports determining, according to the name of the first-webpage resource stored in the client and the names of all the resources required for loading the first webpage, the first push resource to be sent to the client.

Further, the client sends a protocol support capability request to the server, where the protocol support capability request is used to request whether the server supports determining, according to the name of the first-webpage resource stored in the client and the names of all the resources required for loading the first webpage, the first push resource to be sent to the client. The server sends a protocol support capability response to the client according to a protocol support capability of the server, and the client receives the protocol support capability response sent by the server, and determines, according to the protocol support capability response, whether the server supports the foregoing technical solution in the present disclosure. For more detailed description, refer to an embodiment on a server side.

In the foregoing implementation manner provided in the present disclosure, a client may determine whether a server supports determining, according to a name of a resource that is of a first webpage stored in the client and names of all resources required for loading the first webpage, a first push resource to be sent to the client. The client determines, according to a determining result, whether to wait for the server to push a resource or actively request a resource using an existing technology. the client waits for the server to push the resource when the server supports determining, according to a name of a resource that is of a first webpage stored in the client and names of all resources required for loading the first webpage, a first push resource to be sent to the client, or the client actively requests, from the server, the resource using the existing technology when the server does not support determining, according to a name of a resource that is of a first webpage stored in the client and names of all resources required for loading the first webpage, a first push resource to be sent to the client, thereby implementing compatibility with a conventional webpage loading technology.

Figure 7:
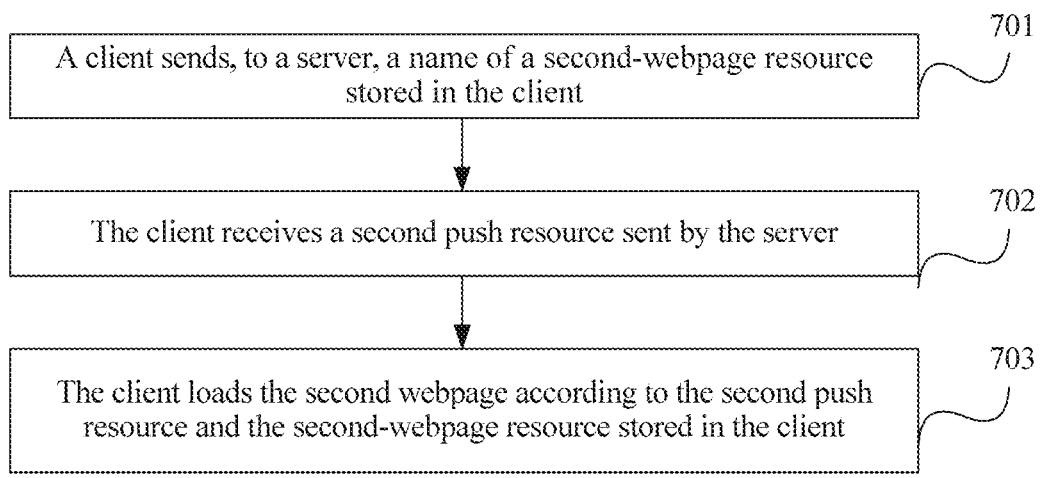
FIG. 7 is a schematic flowchart of Embodiment 6 of a webpage loading method according to the present disclosure.

Generally, there is a rule in accessing a webpage by the client. Generally, the client may continuously access different webpages that belong to a same website, and the server may learn this access rule by a technical means such as statistics collection. Therefore, to improve efficiency of loading webpages of an entire web site by the client, further, as shown in FIG. 7, FIG. 7 is a schematic flowchart of Embodiment 6 of a webpage loading method according to the present disclosure, and steps in FIG. 7 are additional steps based on the embodiment shown in FIG. 5 or FIG. 6.

Step 701: The client sends, to the server, a name of a second-webpage resource stored in the client.

The first webpage and the second webpage are located on a same website.

The client sends the name of the second-webpage resource to the server, and the server receives the name, sent by the client, of the second-webpage resource that is stored in the client and that is of a website on which the first webpage is located. The second webpage is a webpage that the client may possibly continue to access after accessing the first webpage, where the name of the second-webpage resource of the website on which the first webpage is located and the name of the first-webpage resource are generally included in a same message for sending to the server.

It should be noted that the name of the second-webpage resource stored in the client may be determined in multiple manners. A manner may include that the client determines the name of the second-webpage resource stored in the client and sends the name to the server, for example, the client determines the name of the second-webpage resource according to an attribute of a locally stored resource, and the attribute of the resource includes an expression of a webpage to which the resource belongs, or the client may store in advance names of all resources in the second-webpage resource, or request, from the server, names of all resources of the second webpage, and determine, according to the names of all the resources of the second webpage, the name of the second-webpage resource stored in the client, or the client may further send, to the server, all names of all locally stored resources of a website on which the second webpage is located, and the server determines the name of the second-webpage resource stored in the client. The present disclosure imposes no limitation on this, as long as resource names sent to the server by the client include the name of the second-webpage resource stored in the client.

Step 702: The client receives a second push resource sent by the server.

The server determines, according to a preset rule, an address of the second webpage that the client continues to access after accessing the first webpage, determines, according to the address of the second webpage, names of all resources required for loading the second webpage, and determines a second push resource according to the names of all the resources required for loading the second webpage, the name of the second-webpage resource stored in the client, and the first push resource, where the second push resource is all the resources required for loading the second webpage apart from the first push resource and the second-webpage resource stored in the client.

Step 703: The client loads the second webpage according to the second push resource and the second-webpage resource stored in the client.

The client may load the second webpage according to the names that are sent by the server and that are of all the resources required for loading the second webpage, the second-webpage resource stored in the client, and the second push resource pre-pushed by the server when accessing the second webpage.

In this embodiment, a client sends, to a server, a name of a second-webpage resource stored in the client, such that the server determines a second push resource to be sent to the client. The client receives the second push resource sent by the server, and the client loads the second webpage according to the second push resource and the second-webpage resource stored in the client when requesting to access the second webpage. The second push resource is sent in advance to the client by the server. Therefore, loading efficiency may be improved, thereby improving efficiency of loading webpages of an entire website.

Figure 8:
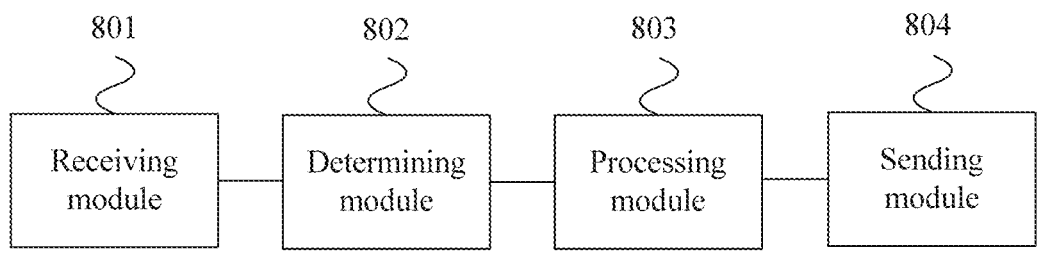
FIG. 8 is a schematic structural diagram of Embodiment 1 of a webpage loading apparatus according to the present disclosure.

FIG. 8 is a schematic structural diagram of Embodiment 1 of a webpage loading apparatus according to the present disclosure. The apparatus in this embodiment is deployed on a server side, and the apparatus in this embodiment includes a receiving module 801, a determining module 802, a processing module 803, and a sending module 804. The receiving module 801 is configured to receive an address of a first webpage and a name of a resource that is of the foregoing first webpage and that is stored in a client, where the address and the name are sent by the foregoing client, and the foregoing first webpage is a webpage that the foregoing client currently requests to access. The determining module 802 is configured to determine, according to the foregoing address of the first webpage, names of all resources required for loading the foregoing first webpage. The processing module 803 is configured to determine a first push resource according to the name of the foregoing first-webpage resource stored in the foregoing client and the names of all the resources required for loading the foregoing first webpage, where the foregoing first push resource is all the resources required for loading the foregoing first webpage apart from the foregoing first-webpage resource stored in the foregoing client. The sending module 804 is configured to send the foregoing first push resource to the foregoing client.

The apparatus in this embodiment may be correspondingly configured to execute the technical solution in the method embodiment shown in FIG. 2, an implementation principle and a technical effect that are of the apparatus are similar, and details are not described herein.

In the foregoing embodiment, the receiving module 801 is further configured to receive a time indication sent by the foregoing client, where the time indication is time information of the foregoing first-webpage resource stored in the foregoing client, and the foregoing processing module 803 is further configured to determine, according to the foregoing time indication, a resource that needs to be updated in the foregoing first-webpage resource stored in the foregoing client, and determine a latest resource corresponding to the foregoing resource that needs to be updated, and the foregoing sending module 804 is further configured to send the foregoing latest resource to the foregoing client.

In the foregoing embodiment, the foregoing time indication is a time at which the foregoing client accesses the foregoing first webpage last lime, and the foregoing processing module 803 is further configured to determine, according to the time at which the foregoing client accesses the foregoing first webpage last time, the resource that needs to be updated in the foregoing first-webpage resource stored in the foregoing client.

In the foregoing embodiment, the foregoing time indication is a time at which the foregoing server modifies the foregoing first-webpage resource and that is received when the foregoing client accesses the foregoing first webpage last time, and the foregoing processing module 803 is further configured to determine, according to the time at which the foregoing server modifies the foregoing first-webpage resource and that is received when the foregoing client accesses the foregoing first webpage last time, the resource that needs to be updated in the foregoing first-webpage resource stored in the foregoing client.

In the foregoing embodiment, the foregoing time indication is a time at which each resource in the foregoing first-webpage resource stored in the foregoing client is stored, and the foregoing processing module 803 is further configured to determine, according to the time at which each resource in the foregoing first-webpage resource stored in the foregoing client is stored, the resource that needs to be updated in the foregoing first-webpage resource stored in the foregoing client.

The apparatus in the foregoing embodiment may be correspondingly configured to execute the technical solution in the method embodiment shown in FIG. 3. An implementation principle and a technical effect that are of the apparatus are similar, and details are not described herein.

In the foregoing embodiment, the foregoing sending module 804 is further configured to send, to the foregoing client, the names of all the resources required for loading the foregoing first webpage, such that the foregoing client determines, according to the names of all the resources required for loading the foregoing first webpage, the name of the foregoing first-webpage resource stored in the foregoing client.

In the foregoing embodiment, the foregoing receiving module 801 is further configured to receive a name, sent by the foregoing client, of a second-webpage resource and that is stored in the foregoing client, where the foregoing first webpage and the foregoing second webpage are located on a same website. The foregoing determining module 802 is further configured to determine, according to a preset rule, an address of the foregoing second webpage to be accessed by the foregoing client, and determine, according to the address of the foregoing second webpage, names of all resources required for loading the foregoing second webpage. The foregoing processing module 803 is further configured to determine a second push resource according to the foregoing names of all the resources required for loading the foregoing second webpage, the name of the foregoing second-webpage resource stored in the foregoing client, and the foregoing first push resource, where the foregoing second push resource is all the resources required for loading the foregoing second webpage apart from the foregoing first push resource and the foregoing second-webpage resource stored in the foregoing client. The sending module 804 is further configured to send the foregoing second push resource to the foregoing client.

The apparatus in the foregoing embodiment may be correspondingly configured to execute the technical solution in the method embodiment shown in FIG. 4. An implementation principle and a technical effect that are of the apparatus are similar, and details are not described herein.

Figure 9:
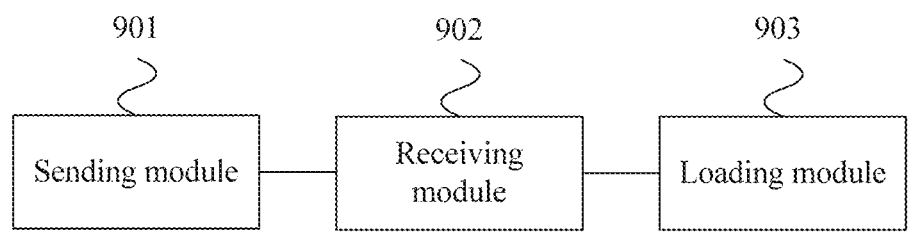
FIG. 9 is a schematic structural diagram of Embodiment 2 of a webpage loading apparatus according to the present disclosure.

FIG. 9 is a schematic structural diagram of Embodiment 2 of a webpage loading apparatus according to the present disclosure. The foregoing webpage loading apparatus is a client, and the apparatus in this embodiment includes a sending module 901, a receiving module 902, and a loading module 903. The sending module 901 is configured to send, to a server, an address of a first webpage and a name of a resource that is of the foregoing first webpage and that is stored in the foregoing client, where the foregoing first webpage is a webpage that the foregoing client currently requests to access. The receiving module 902 is configured to receive a first push resource sent by the foregoing server, where the foregoing first push resource is all resources required for loading the foregoing first webpage apart from the foregoing first-webpage resource stored in the foregoing client. The loading module 903 is configured to load the foregoing first webpage according to the foregoing first push resource and the foregoing first-webpage resource stored in the foregoing client.

The apparatus in the foregoing embodiment may be correspondingly configured to execute the technical solution in the method embodiment shown in FIG. 5. An implementation principle and a technical effect that are of the apparatus are similar, and details are not described herein.

In the foregoing embodiment, the sending module 901 is further configured to send a time indication to the foregoing server, where the foregoing time indication is time information of the foregoing first-webpage resource stored in the foregoing client. The receiving module 902 is further configured to receive a latest resource that is sent by the foregoing server and that is corresponding to a resource that needs to be updated in the foregoing first-webpage resource, where the resource that needs to be updated in the foregoing first-webpage resource is determined by the foregoing server according to the foregoing time indication.

In the foregoing embodiment, the foregoing time indication is any one of the types, the foregoing time indication is a time at which the foregoing client accesses the foregoing first webpage last time, the time indication is a time at which each resource in the foregoing first-webpage resource stored in the foregoing client is stored, or the time indication is a time at which the foregoing server modifies the foregoing first webpage and that is received when the foregoing client accesses the foregoing first webpage last time.

In the foregoing embodiment, the receiving module 902 is further configured to receive time information sent by the foregoing server, where the time information is a time at which the foregoing server modifies the foregoing first-webpage resource the most recent time. The sending module 901 is further configured to send the time indication to the foregoing server when the foregoing client determines that a time indicated by the foregoing time information is later than a time indicated by the foregoing time indication.

The apparatus in the foregoing embodiment may be correspondingly configured to execute the technical solution in the method embodiment shown in FIG. 6. An implementation principle and a technical effect that are of the apparatus are similar, and details are not described herein.

In the foregoing embodiment, the foregoing apparatus further includes a determining module (not shown), where the receiving module 902 is further configured to receive names that are of all the resources required for loading the foregoing first-webpage resource and that are sent by the foregoing server. The determining module is configured to determine, according to the foregoing names of all the resources required for loading the foregoing first webpage, the name of the foregoing first-webpage resource stored in the foregoing client.

In the foregoing embodiment, the sending module 901 is further configured to send, to the foregoing server, a name of a second-webpage resource and that is stored in the foregoing client, where the foregoing first webpage and the foregoing second webpage are located on a same website. The receiving module 902 is further configured to receive a second push resource sent by the foregoing server, where the foregoing second push resource is all resources required for loading the foregoing second webpage apart from the foregoing first push resource and the foregoing second-webpage resource stored in the foregoing client. The loading module 903 is further configured to load the foregoing second webpage according to the foregoing second push resource and the foregoing second-webpage resource stored in the foregoing client.

The apparatus in the foregoing embodiment may be correspondingly configured to execute the technical solution in the method embodiment shown in FIG. 7. An implementation principle and a technical effect that are of the apparatus are similar, and details are not described herein.

Figure 10:
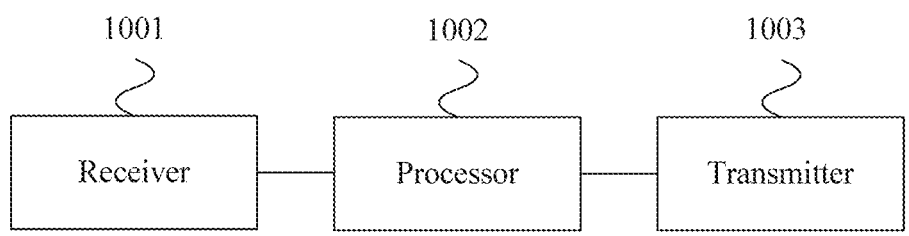
FIG. 10 is a schematic structural diagram of Embodiment 3 of a webpage loading apparatus according to the present disclosure.

FIG. 10 is a schematic structural diagram of Embodiment 3 of a webpage loading apparatus according to the present disclosure. The apparatus in this embodiment is deployed on a server side. As shown in FIG. 10, the apparatus in this embodiment includes a receiver 1001, a processor 1002, and a transmitter 1003. The receiver 1001 is configured to receive an address of a first webpage and a name of a resource that is of the foregoing first webpage and that is stored in a client, where the address and the name are sent by the foregoing client, and the foregoing first webpage is a webpage that the foregoing client currently requests to access. The processor 1002 is configured to determine, according to the address of the foregoing first-webpage resource, names of all resources required for loading the foregoing first webpage, and determine a first push resource according to the name of the foregoing first-webpage resource stored in the foregoing client and the foregoing names of all the resources required for loading the foregoing first webpage, where the foregoing first push resource is all the resources required for loading the foregoing first webpage apart from the foregoing first-webpage resource stored in the foregoing client, and the transmitter 1003 is configured to send the foregoing first push resource to the foregoing client.

The apparatus in this embodiment may be correspondingly configured to execute the technical solution in the method embodiment shown in FIG. 2. An implementation principle and a technical effect that are of the apparatus are similar, and details are not described herein.

In the foregoing embodiment, the receiver 1001 is further configured to receive a time indication sent by the foregoing client, where the foregoing time indication is time information of the foregoing first-webpage resource stored in the foregoing client, and the processor 1002 is further configured to determine, according to the foregoing time indication, a resource that needs to be updated in the foregoing first-webpage resource stored in the foregoing client, and determine a latest resource corresponding to the foregoing resource that needs to be updated, and the transmitter 1003 is further configured to send the foregoing latest resource to the foregoing client.

In the foregoing embodiment, the foregoing time indication is a time at which the foregoing client accesses the foregoing first webpage last lime, and the processor 1002 is further configured to determine, according to the time at which the foregoing client accesses the foregoing first webpage last time, the resource that needs to be updated in the foregoing first-webpage resource stored in the foregoing client.

In the foregoing embodiment, the foregoing time indication is a time at which the foregoing server modifies the foregoing first-webpage resource and that is received when the foregoing client accesses the foregoing first webpage last time, and the processor 1002 is further configured to determine, according to the time at which the foregoing server modifies the foregoing first-webpage resource and that is received when the foregoing client accesses the foregoing first webpage last time, the resource that needs to be updated in the foregoing first-webpage resource stored in the foregoing client.

In the foregoing embodiment, the foregoing time indication is a time at which each resource in the foregoing first-webpage resource stored in the foregoing client is stored, and the processor 1002 is configured to determine, according to the time at which each resource in the foregoing first-webpage resource stored in the foregoing client is stored, the resource that needs to be updated in the foregoing first-webpage resource stored in the foregoing client.

The apparatus in the foregoing embodiment may be correspondingly configured to execute the technical solution in the method embodiment shown in FIG. 3. An implementation principle and a technical effect that are of the apparatus are similar, and details are not described herein.

In the foregoing embodiment, the transmitter 1003 is further configured to send, to the foregoing client, the foregoing names of all the resources required for loading the foregoing first webpage, such that the foregoing client determines, according to the foregoing names of all the resources required for loading the foregoing first webpage, the name of the foregoing first-webpage resource stored in the foregoing client.

In the foregoing embodiment, the receiver 1001 is further configured to receive a name, sent by the foregoing client, of a second-webpage resource and that is stored in the foregoing client, where the foregoing first webpage and the foregoing second webpage are located on a same website. The processor 1002 is further configured to determine, according to a preset rule, an address of the foregoing second webpage to be accessed by the foregoing client, determine, according to the address of the foregoing second webpage, names of all resources required for loading the foregoing second webpage, and determine a second push resource according to the foregoing names of all the resources required for loading the foregoing second webpage, the name of the foregoing second-webpage resource stored in the foregoing client, and the foregoing first push resource, where the foregoing second push resource is all the resources required for loading the foregoing second webpage apart from the foregoing first push resource and the foregoing second-webpage resource stored in the foregoing client, and the transmitter 1003 is further configured to send the foregoing second push resource to the foregoing client.

The apparatus in the foregoing embodiment may be correspondingly configured to execute the technical solution in the method embodiment shown in FIG. 4. An implementation principle and a technical effect that are of the apparatus are similar, and details are not described herein.

Figure 11:
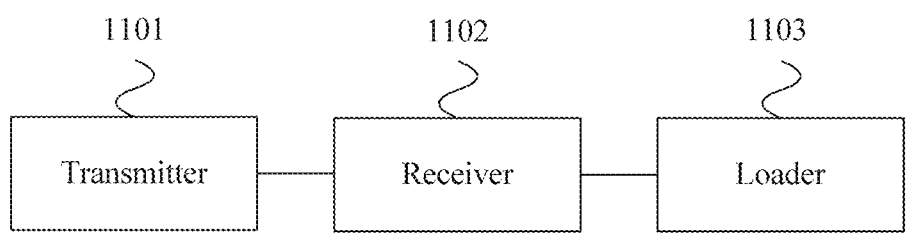
FIG. 11 is a schematic structural diagram of Embodiment 4 of a webpage loading apparatus according to the present disclosure.

FIG. 11 is a schematic structural diagram of Embodiment 4 of a webpage loading apparatus according to the present disclosure. The foregoing webpage loading apparatus is a client, and the apparatus in this embodiment includes a transmitter 1101, a receiver 1102, and a loader 1103. The transmitter 1101 is configured to send, to a server, an address of a first webpage and a name of a resource that is of the foregoing first webpage and that is stored in the foregoing client, where the foregoing first webpage is a webpage that the foregoing client currently requests to access. The receiver 1102 is configured to receive a first push resource sent by the foregoing server, where the foregoing first push resource is all resources required for loading the foregoing first webpage apart from the foregoing first-webpage resource stored in the foregoing client, and the loader 1103 is configured to load the foregoing first webpage according to the foregoing first push resource and the foregoing first-webpage resource stored in the foregoing client.

The apparatus in this embodiment may be correspondingly configured to execute the technical solution in the method embodiment shown in FIG. 5. An implementation principle and a technical effect that are of the apparatus are similar, and details are not described herein.

In the foregoing embodiment, the transmitter 1101 is further configured to send a time indication to the foregoing server, where the foregoing time indication is time information of the foregoing first-webpage resource stored in the foregoing client, and the receiver 1102 is further configured to receive a latest resource that is sent by the foregoing server and that is corresponding to a resource that needs to be updated in the foregoing first-webpage resource, where the resource that needs to be updated in the foregoing first-webpage resource is determined by the foregoing server according to the foregoing time indication.

In the foregoing embodiment, the foregoing time indication is any one of the types, the foregoing time indication is a time at which the foregoing client accesses the foregoing first webpage last time, the time indication is a time at which each resource in the foregoing first-webpage resource stored in the foregoing client is stored, or the time indication is a time at which the foregoing server modifies the foregoing first webpage and that is received when the foregoing client accesses the foregoing first webpage last time.

In the foregoing embodiment, the foregoing receiver 1102 is further configured to receive time information sent by the foregoing server, where the time information is a time at which the foregoing server modifies the foregoing first-webpage resource the most recent time, and the transmitter 1101 is further configured to send the time indication to the foregoing server when the foregoing client determines that a time indicated by the foregoing time information is later than a time indicated by the foregoing time indication.

The apparatus in the foregoing embodiment may be correspondingly configured to execute the technical solution in the method embodiment shown in FIG. 6. An implementation principle and a technical effect that are of the apparatus are similar, and details are not described herein.

In the foregoing embodiment, the receiver 1102 is further configured to receive names that are of all the resources required for loading the foregoing first-webpage resource and that are sent by the foregoing server, and a processor (not shown) is configured to determine, according to the foregoing names of all the resources required for loading the foregoing first webpage, the name of the foregoing first-webpage resource stored in the foregoing client.

In the foregoing embodiment, the transmitter 1101 is further configured to send, to the foregoing server, a name of a second-webpage resource and that is stored in the foregoing client, where the foregoing first webpage and the foregoing second webpage are located on a same website. The receiver 1102 is further configured to receive a second push resource sent by the foregoing server, where the foregoing second push resource is all resources required for loading the foregoing second webpage apart from the foregoing first push resource and the foregoing second-webpage resource stored in the foregoing client, and the loader 1103 is further configured to load the foregoing second webpage according to the foregoing second push resource and the foregoing second-webpage resource stored in the foregoing client.

The apparatus in the foregoing embodiment may be correspondingly configured to execute the technical solution in the method embodiment shown in FIG. 7. An implementation principle and a technical effect that are of the apparatus are similar, and details are not described herein.

Persons of ordinary skill in the art may understand that all or some of the steps of the method embodiments may be implemented by a program instructing relevant hardware. The program may be stored in a computer-readable storage medium. The steps of the method embodiments are performed when the program runs. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without making essence of the corresponding technical solutions depart from the scope of the technical solutions of the embodiments of the present disclosure.

What is claimed is:

1. A webpage loading method implemented by a server, the webpage loading method comprising:
    receiving, from a client, an address of a first webpage, a first name of a first-webpage resource, and time information associated with the first name, wherein the first webpage is associated with a plurality of resources needed for loading the first webpage, wherein each of the resources corresponds to a name, and wherein a first one of the resources corresponds to the first name;

determining, according to the time information, a resource that needs to be updated in the first-webpage resource;

generating a first push resource according to the address, the first name, and the time information, wherein the first push resource comprises the resources except for the first one of the resources and comprises an updated resource in the first-webpage resource; and sending, to the client, the first push resource.

2. The method of claim 1, further comprising:

determining, according to the address, names of all of the resources; and determining the first push resource according to the first name and the names.

3. The method of claim 1, further comprising sending, to the client, names of all of the resources needed for loading the first webpage.

4. The method of claim 1, wherein the first name comprises parameters that uniquely identify the first-webpage resource.

5. The method of claim 4, wherein the parameters comprise a size attribute and a user identity.

6. The method of claim 1, wherein the first name comprises a data structure represented by a list.

7. The method of claim 1, wherein the first name comprises a data structure represented by an array.

8. The method of claim 1, wherein the first name comprises a data structure represented by a character string.

9. The method of claim 1, wherein the first name comprises a data structure represented by an Extensible Markup Language (XML) file.

10. The method of claim 1, further comprising further receiving the address, the first name, and the time information in a request message.

11. A device comprising:

a memory configured to store instructions; and a processor coupled to the memory and configured to execute the instructions to:

receive, from a client, an address of a first webpage, a first name of a first-webpage resource, and time information associated with the first name, wherein the first webpage is associated with a plurality of resources needed for loading the first webpage, wherein each of the resources corresponds to a name, and wherein a first one of the resources corresponds to the first name;

determine, according to the time information, a resource that needs to be updated in the first-webpage resource;

generate a first push resource according to the address, the first name, and the time information, wherein the first push resource comprises the resources except for the first one of the resources and comprises an updated resource in the first-webpage resource; and send, to the client, the first push resource.

12. The device of claim 11, wherein the processor is further configured to:

determine, according to the address, names of all of the resources; and determine the first push resource according to the first name and the names.

13. The device of claim 11, wherein the processor is further configured to send, to the client, names of all of the resources needed for loading the first webpage.

14. The device of claim 11, wherein the first name comprises parameters that uniquely identify the first-webpage resource.

15. The device of claim 11, wherein the parameters comprise a size attribute and a user identity.

16. The device of claim 11, wherein the first name comprises a data structure represented by a list, an array, a character string, or an Extensible Markup Language (XML) file.

17. A system comprising:

a client configured to send an address of a first webpage, a first name of a first-webpage resource, and time information associated with the first name, wherein the first webpage is associated with a plurality of resources needed for loading the first webpage, wherein each of the resources corresponds to a name, and wherein a first one of the resources corresponds to the first name; and a server coupled to the client and configured to:

receive, from the client, the address, the first name, and the time information;

determine, according to the time information, a resource that needs to be updated in the first-webpage resource;

generate a first push resource according to the address the first name, and the time information, wherein the first push resource comprises the resources except for the first one of the resources and comprises an updated resource in the first-webpage resource; and send, to the client, the first push resource.

18. The system of claim 17, wherein the server is further configured to:

determine, according to the address, names of all of the resources; and determine the first push resource according to the first name and the names.

19. The system of claim 17, wherein the server is further configured to send, to the client, names of all of the resources needed for loading the first webpage.

20. The system of claim 17, wherein the first name comprises parameters that uniquely identify the first-webpage resource.

21. The system of claim 20, wherein the parameters comprise a size attribute and a user identity.

* * * * *